Patented June 30, 1942

2,288,460

UNITED STATES PATENT OFFICE 2,288,460

PROCESS FOR THE MANUFACTURE OF PHOSPHORIC ACID AND ITS SALTS

Jasper H. Kane, Brooklyn, and Harry G. Hansen, Richmond Hill, N. Y., assignors to Charles Pfizer & Company, Brooklyn, N. Y., a corporation of New Jersey No Drawing. Application May 22, 1940, Serial No. 336,590

4 Claims. (Cl. 23—165)

This invention relates to the production of phosphoric acid and its salts and has for its object to provide a new and improved process for this purpose.

Of the commercially valuable compounds of phosphorus, the orthophosphates are perhaps the most important. In addition, orthophosphoric acid has many uses as an acid.

For many years it was customary to prepare orthophosphoric acid from the naturally occurring tricalcium orthophosphate, which is found in impure form in bones or in phosphate rock, by treatment with dilute sulfuric acid and subsequent filtration from the resulting calcium sulfate. An obvious defect of the process is the low concentration of the resulting solution of orthophosphoric acid, as well as the partial retention of various impurities present in the raw material. Within the last decade various minor improvements (as reported, for example, by W. C. Weber in Chem. & Met. Eng. 1932: 659) have permitted raising the concentration to some 32% of phosphorus pentoxide.

Another method, described by H. W. Rudd in the Industrial Chemist for June 1939, was to oxidize pure white phosphorus with atmospheric oxygen in the presence of wet steam, and to concentrate the resulting weak acid solution by evaporation. The raw material obviously was expensive and dangerous to handle, and the operating cost high. Although one company operated this process in London for about 50 years, it was discontinued some three years ago "for economic reasons."

It is also known to make phosphoric acid by adding $P_2O_5$ to an excess of water with which it readily combines, releasing energy in the form of heat, and forming at first metaphosphoric acid. Upon further treatment there is formed orthophosphoric acid, which is the stable form retaining a minimum of energy and is of little or no value except as an acid. In consequence, the above process represents a considerable loss in chemical values and apparently has not been commercially successful although constituting a step in the right direction.

We have now found that it is advantageous to subject the $P_2O_5$ to an initial locating step in intimate contact with certain aliphatic dicarboxylic acids which are capable of forming volatile organic anhydrides. In this way the violence of the first reaction with water is controlled without resort to the obvious and wasteful device of using a large excess of water as diluent and cooling agent. In fact, in our process it is preferable to use water-free carboxylic acids. The resulting organic anhydrides are removed by distillation and condense in very pure form. To make sure that no traces of organic acid are left to contaminate the phosphoric acid product, it is desirable to supply approximately 2.4 mols. of the organic acid per mol. of phosphorus pentoxide.

As J. H. Lum and others have shown (Chem. & Met. Eng. 44: 721-3) phosphorus pentoxide upon contact with water quickly forms an equilibrium mixture which reacts as orthophosphoric acid, so that the real problem in hydrating phosphorus pentoxide is control of the high degree of energy released during the first step of hydration. When organic matter is present, there is under ordinary conditions a formation of tar which suggests reduction of the phosphorus pentoxide and formation of complex materials difficult to separate. Perhaps for this reason, the literature describing reaction of phosphorus pentoxide with organic matter refers to discarding the phosphorus-containing tarry mass or omits mention of it altogether.

For example Boris W. Malishev in reporting the use of phosphorus pentoxide as a refining agent for gasoline (Ind. Eng. Chem. 28: 190-3, 1936) says, "The spent phosphorus pentoxide, which coagulated to a liquid tarry mass and settled at the bottom of the flash chamber, was periodically drained." He further points out that the success of his process depends upon the fact that the amount of phosphorus pentoxide required is very small, a limitation which obviously would not need to be considered if phosphoric acid could be obtained by means of his process.

However, we have found that by properly controlling the initial release of energy by heating with certain organic acids in the absence of free water and under conditions permitting the continuous removal of substantial amounts of volatile organic by-products, formation of tar is not a serious obstacle. The yields of phosphoric acid are high, and the tar is eliminated by extracting the nonvolatile residues with water containing a suitable adsorbent. Organic anhydrides formed in our process and removed therefrom by distillation may be recovered in very pure condition and used as anhydrides, or may be regenerated by treatment with water and returned to the process.

As adsorbents for the removal of impurities we prefer certain highly active bone blacks, such as the preparations grouped under the commercial name "Darco," although wood char, kieselguhr, bentonite and similar adsorbents can be used.

While most of our work has been carried out at atmospheric pressure, in some cases it may be advantageous to carry out the initial reaction at reduced pressures, in which event lower reaction temperatures can be used.

For the preparation of salts (phosphates) the solution, usually after boiling with excess water, may be reacted with the appropriate base.

*Example 1.*—40 parts of phosphorus pentoxide was intimately mixed with 60 parts of itaconic acid, and the temperature gradually raised to a maximum of 282° C. Approximately 36 parts of a clear colorless liquid consisting mainly of citraconic anhydride distilled over and was collected in the receiver. The black, tarry-appearing nonvolatile residue was extracted with several parts of water, 2½ parts of Darco was added and the suspension raised to the boiling point. After filtering off the insoluble matter, a solution containing 48 parts of phosphoric acid (calculated as 100% phosphoric acid) was obtained.

*Example 2.*—A mixture of three parts phosphorus pentoxide and six parts fumaric acid was heated gradually to 210° C., until no further distillation occurred. Most of the by-product distilled over at about 200–204° C. The nonvolatile product of the reaction was treated with several parts of water, boiled for about 20 minutes, 0.20 part Darco G–60 was added, and the solution was filtered. An almost water-clear filtrate was obtained which contained 4.1 parts phosphoric acid, a yield of about 99%. As a by-product we obtained 3.50 parts of maleic anhydride.

*Example 3.*—A mixture of three parts phosphorus pentoxide and six parts succinic acid was gradually heated to 280° C. until no further distillate came over. Most of the by-product comes over between 258° and 264° C. The residue was worked up as before. 4 parts of phosphoric acid was produced and 3.8 parts of succinic anhydride were obtained as a by-product.

We claim:

1. Process for the preparation of phosphoric acid consisting in reacting phosphorus pentoxide with a water-free aliphatic dicarboxylic acid capable of forming a volatile organic anhydride, and heating at a temperature above the vaporizing point of the said anhydride until no further distillation occurs, thereby leaving a black tarry-appearing residue, then extracting phosphoric acid from the nonvolatile residues by treatment with water and an adsorbent, whereby after filtering a substantially colorless concentrated phosphoric acid solution is obtained.

2. Process for the preparation of phosphoric acid consisting of reacting phosphorus pentoxide with one and one half times its weight of itaconic acid, heating to a maximum temperature of 282° C. until distillation of the by-product citraconic anhydride is complete, thereby leaving a black tarry-appearing residue and separating phosphoric acid from the nonvolatile residue by extraction with water and an active adsorbent carbon, whereby after filtering a substantially colorless concentrated phosphoric acid solution is obtained.

3. Process for the preparation of phosphoric acid consisting of reacting phosphorus pentoxide with approximately twice its weight of fumaric acid, heating gradually to 210° C. until distillation of the by-product maleic anhydride is complete, thereby leaving a black tarry-appearing residue and separating phosphoric acid from the nonvolatile residue by treatment with water and an active adsorbent carbon, whereby after filtering a substantially colorless concentrated phosphoric acid solution is obtained.

4. Process for the preparation of phosphoric acid consisting of reacting phosphorus pentoxide with about twice its weight of succinic acid, heating at 258° C. to 280° C. until distillation of the by-product succinic anhydride is complete, thereby leaving a black tarry-appearing residue and separating phosphoric acid from the nonvolatile residues by treatment with water and an active adsorbent carbon, whereby after filtering a substantially colorless concentrated phosphoric acid solution is obtained.

JASPER H. KANE.
HARRY G. HANSEN.